United States Patent [19]

Tota

[11] 4,448,502
[45] May 15, 1984

[54] SPREADABLE BAR FOR EYEGLASS FRAMES PROVIDED WITH A SPRING HINGE

[76] Inventor: Giuseppe Tota, Agordo (Belluno), Italy

[21] Appl. No.: 278,169

[22] Filed: Jun. 29, 1981

[30] Foreign Application Priority Data

Oct. 16, 1980 [IT] Italy .................. 3810 B/80[U]

[51] Int. Cl.³ .................................... G02C 5/16
[52] U.S. Cl. ............................ 351/153; 351/113
[58] Field of Search ............... 351/113, 153, 121; 16/228

[56] References Cited

U.S. PATENT DOCUMENTS 3,034,402  5/1962  Alberetti ..................... 351/113
3,744,887  7/1973  Dunbar ........................ 351/153

*Primary Examiner*—John K. Corbin
*Assistant Examiner*—Rodney B. Bovernick
*Attorney, Agent, or Firm*—Kirschstein, Kirschstein, Ottinger & Israel

[57] ABSTRACT

There is disclosed a spreadable bar for eyeglass frames provided with a spring hinge, this latter being fixed to the bar and including a guiding and hinging portion fixed to the eyeglass frame, wherein the guiding and hinging portion is made from a flexible material and at least another portion of the hinge, i.e. the hinge covering portion or casing is made from a synthetic material, such as nylon, polyamide resins, possibly filled with fiberglass and the like.

3 Claims, 7 Drawing Figures

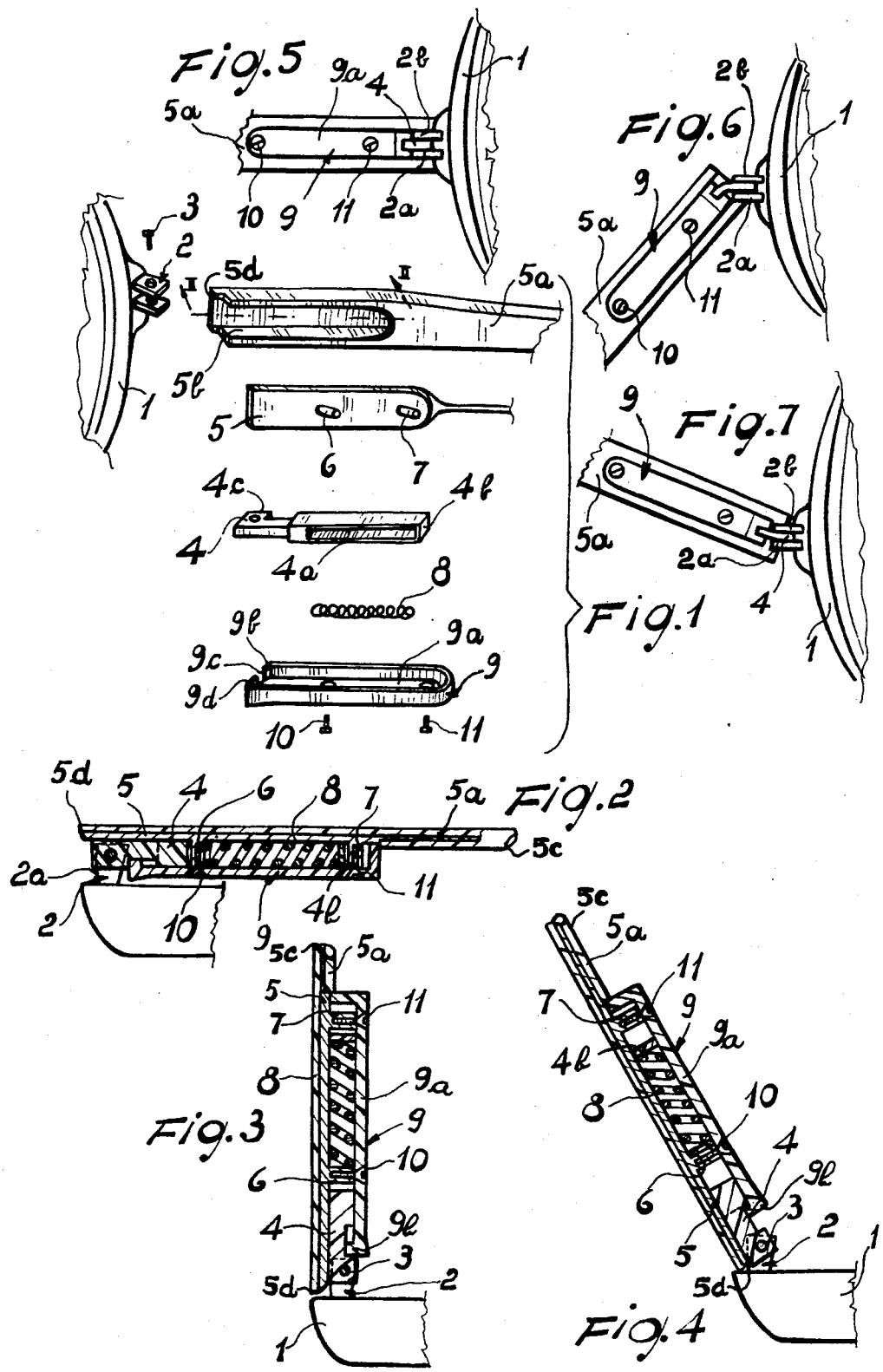

SPREADABLE BAR FOR EYEGLASS FRAMES PROVIDED WITH A SPRING HINGE

BACKGROUND OF THE INVENTION

The present invention relates to a spreadable bar for eyeglass frames provided with a spring hinge.

As it is known the resiliency in the horizontal plane of the eyeglass frame bars, as provided with spring hinges, permits a more rational and convenient use of the eyeglasses to be obtained, in such a way as to be able of fitting any users, the rod being effective to provide a slight and suitable pressure on the user head, thereby assuring a stable and positive engaging together with the bearing on the nose of the nose-piece of the eyeglass frame.

More specifically, the eyeglass makers tend to supply eyeglasses provided with such a bar, by using working devices and methods effective to afford this possibility, or resiliency.

There are substantially known two systems for obtaining eyeglass frame bars effective to be spread apart in a horizontal plane. The first is to practically construct the bar in two portions and engage these portions by means of leaf springs, in such a way as to permit the bar end portion to swing.

The second system consists of applying a spring biassed hinge on the bar, more precisely in the zone whereof adjoining the eyeglass frame. In these hinges there is provided an inner guiding portion, provided with a projected end which projects from the hinge and is pivoted on the eyeglass frame.

The first system is generally inferior to the second, because of constructional difficulties and the poor aesthetic aspect of the bar which seemingly is broken.

Based on the concept of the second system, that is to spring bias the hinge connecting the bar to the eyeglass frame, several constructional solutions have been devised and, generally, each eyeglass maker adopts a solution of his own for his eyeglasses.

However all these constructional approaches are based on the same system including a coil spring housed in the bar hinge fixed to the eyeglass frame bar, said spring being enclosed in the projecting guiding portion of the hinge, and, more precisely, it is housed between the inner end of said guiding portion and a fixed abutment of the bar, which abutment penetrates the cavity of the guiding portion housing said spring. Accordingly, as the bar is spread apart or opened, it provides, because of its contacting movement with the bar hinging bearing, a pressing on said spring and this latter, in turn, will provide a reaction force tending to cause the bar to be reset.

All of the approaches relating spring biassed hinges characteristically are completely made of metal, such as, for example, stainless steel or metal alloys.

A main drawback of the known spring biassed hinge eyeglasses is the great wear of the metal portions due to repeated opening and closing movements of the bars. Moreover the coil spring itself, made of steel, tends to loose its efficacy. Furthermore the known spring biassed eyeglass bar hinges, being made of a metal material, have a comparatively high weight which, as it is well known, is rather annoying for the user, because of the pressure exercised by the eyeglasses on the bloodvessels and veins of the user's nose thereby, after a time, the blood circulation of the user is slackened with consequent headaches, fatiguing of the eyes and the like.

Furthermore, in the case in which stainless steel is used, great manufacturing difficulties arise, because of the material itself, and, in addition, it is necessary to carry out plating operations. In the case in which metal alloys are used, oxidation phenomena and colour changes occurs, which are antiaesthetic, due to the corrosion of the sweat depositing on said metal parts. This depositing, furthermore, favours the depositing of dust and the like, thereby dirt builds up abrading the metal portions of the hinge. This fact makes the bar movements difficult and, after a some degree of abrading, clearances are formed negatively affecting the operation of the hinge springs.

A further drawback of the metal hinges is that the metal parts can cause wounds in the case of impacts, accidents and falls, in particular in the case of children.

These drawbacks, from one side, are favoured by the presence of metal parts and, on the other side, are frequently related to the rigidity of said metal parts, since these latter do not afford the possibility of causing the bar to swing in the vertical plane and even, in the case of high swinging stresses in the vertical plane, the bar or the supporting portion whereof breaks, with consequent woundings as due to the impacts of these broken portions on the user's face.

SUMMARY OF THE INVENTION

Thus, the primary object of the present invention is to provide a spreadable bar for eyeglass frames with spring hinge, effective to eliminate the thereinabove mentioned drawbacks.

Yet another object of the present invention is to maintain the known constructional approaches, which have proved to be operatively valid, and intervene in the making whereof in such a way as to obtain, from one side, the desired flexiblity and lightness of the hinge portion, and, on the other side, to facilitate and simplify the construction of the individual portions of said hinge.

Yet another object of the invention is to obviate the need of carrying out subsequent treating steps, such as, for example the known plating.

According to one aspect of the present invention the aforesaid objects are achieved by a spreadable bar for eyeglass frames provided with a spring hinge, said hinge being fixed to said bar and provided with a guiding and hinging portion fixed to the eyeglass frame, characterized in that said guiding and hinging portion is made from a flexible material.

Advantageously the flexibility or resiliency is obtained by using a synthetic material, such as nylon, polyamide resins and the like. Owing to this solution, in addition to the flexiblity provided by the resiliency of these synthetic materials in embodiments of small thickness, it is possible to reduce considerably the weight, with respect to a like portion made of metal.

Furthermore, by selecting such synthetic materials, it is possible to contemporaneously solve all of the problems relating to wear, oxidations and colour changes, since these materials are not oxidizable. Also the construction of these portions is moreover greatly simplified.

According to the invention, not only the spring guiding and hinging portion can be made of such a synthetic material, to achieve the thereinabove mentioned objects, but also the remaining portions of the hinge can be made of such synthetic materials, thereby bringing about a further reduction of the hinge assembly.

According to another advantageous aspect of the present invention, also the hinge spring is made of such a synthetic material.

BRIEF DESCRIPTION OF THE DRAWING

Further advantages and characteristics of the invention will become more apparent from the following detailed description of a spreadable bar for eyeglass frames with spring hinge, with reference to the accompanying drawing, where:

FIG. 1 is a partial view of an eyeglass spreadable bar, the component parts of the hinge being represented in exploded form;

FIG. 2 is a cross-section of FIG. 1, taken along the line II—II thereof, with the hinge mounted in the spreadable bar, this latter being abutted against the eyeglass frame;

FIG. 3 is another cross-section view, as in FIG. 2, but with the bar open, that is in the use condition whereof;

FIG. 4 is a cross-section view like FIG. 2, but with the bar spread apart by a spreading force, beyond its use open position;

FIG. 5 is a partial view from inside of a bar with hinge according to the invention, in its use position; and FIGS. 6 and 7 are respectively partial views like FIG. 5, but with the bar caused to swing by a force, downwardly and respectively upwardly in the vertical plane.

DESCRIPTION OF THE PREFERRED EMBODIMENT

At 1 it has been indicated an eyeglass frame, of known type, in each side whereof there is housed a base 2 for hinging a bar 5a, as it will be described in a more detailed way thereinafter. The base 2 consists of a fork member embedded in the frame 1 and provided with projecting arms 2a,2b and through threaded holes for housing the hinging screw 3. As is clearly represented on the drawing, the bar 5a is hinged by means of the guiding and hinging portion 4 of the hinge.

Said guiding and hinging portion 4 is made, according to the invention, of a resilient synthetic plastics material, such as nylon, polyamide resins, possibly filled, or other synthetic material effective to resist against wear and advantageously flexible as it is stressed. The shape of this guiding portion is clearly shown in FIG. 1.

At 5 there is indicated a flat member, provided with a stem 5c, and having the shape shown in FIG. 1, said flat member being made of metal and forming the metal core of the bar 5a, this latter being made of a synthetic material, such as, for example acetate. Said flat member 5 can also form an integral part with the bar 5a, as this latter is made of a metal, such as for example in the case of an eyeglass frame made completely of metal. The flat member 5 can also be free of the stem 5c.

Said flat member 5 is provided, on its contacting side, upon assemblying to the guiding portion 4, with two female threaded pins 6 and 7 which are respectively housed in the cavity 4a of the guiding portion 4 and on the outside of said guiding portion 4, that is outside the end 4b whereof opposite to the hinging end 4c.

Between the end 4b of the guiding portion 4 and the pin 6, housed in the cavity 4a, upon having completed the assemblying operations, there is inserted, by suitably pressing thereon, the coil spring 8. This latter can be made of a metal, as it is well known, or, advantageously of a resilient synthetic material. Accordingly, at the end of the assemblying operations, the spring 8 will be housed in a preloaded condition, or compressed condition, between the end 4b of the guiding portion 4, from one side, and a fixed abutment of the bar 5a, that is against the pin 6, from the other side, and accordingly it provides a pushing force on said end or bottom 4b, acting to hold the bar 5a in a position whereof which will be a predetermined closed (FIG. 2) or open (FIG. 3) position.

At 9 there is indicated a covering member for the hinge, having a box like shape, and being provided with a cavity or hollow 9a and a front portion having two side edges 9b with an intermediate slot 9c. In the cavity 9a there is housed the guiding portion 4, the hinging end whereof projecting from the slot 9c. The cover 9 is fixed to the flat member 5 by means of the screws 10 and 11 engaging in the threaded holes of the pins 6 and 7.

Advantageously the cover 9 is made of a synthetic material, for example nylon or the like, and, in the illustrated case, it is partially housed in the cavity 5b provided in the bar 5a, as it is shown in FIG. 1.

The operation of the bar 5a, that is the operation of the spring hinge 9 can be easily deduced by the above description of the structure of these parts.

It should be noted that, by passing from the position of FIG. 2 to that of FIG. 3, during a normal opening operation of the bar, the spring 8 will continue to provide a constant force in the inside of the guiding portion 4, thereby, before reaching the position of FIG. 3, the bar will tend to always return to its resting or idle position, that is to the position of FIG. 2.

In the position of FIG. 3, that is the position of normal opening of the bar with respect to the frame 1, the force of the spring 8 will be directed in an aligned direction with respect to the screw 3, thereby compensating for any bending stresses and assuring a stable locating of the bar. Finally, if the bar 5a is opened or spread apart in the horizontal plane beyond its normal position, as it is shown in FIG. 4, for example in the case of accidents, falls and the like, then the front corner 5d of the bar 5a will contact the frame 1, thereby acting as a fulcrum, the spring 8 being further compressed and accordingly tending to cause the bar 5a to return to the normal use position whereof. In any case, during such a stress, the eyeglass will be prevented from breaking and wounding the user. According to the invention, in order to facilitate the return movement of the bar 5a, after an opening thereof due to an outside force or stress (as shown in FIG. 4), the outside side 2a of the base 2 is slanted inwardly.

By exploiting, according to the invention, the resiliency of the materials employed in the described embodiment the bar 5a is also capable of resisting against stresses in the vertical plane, as shown in FIGS. 6 and 7, without breaking, as it inevitably will occur with parts made of metal.

From the above description it should be clear that with the approach according to the invention the mentioned objects and advantages are fully obtained and the drawback of the spreadable bar with spring hinge of known type are thus completely eliminated.

Obviously the structure of the bars, or of the spring hinges can be different from that which has been illustrated, the concept of the invention being the use of a portion of synthetic material, that is the hinging and guiding portion 4, and the use of other portions, also of synthetic material, for example the spring and cover.

I claim:

1. An eyeglass frame having a base at each side thereof and a spring hinge assembly for each base, each spring hinge assembly including:
   - (A) a base,
   - (B) a bar,
   - (C) a spring hinge joining said bar to said base, said spring hinge comprising:
     - (i) a cavity at the proximal end of said bar, said cavity having an open end facing said base,
     - (ii) a projection extending away from the base of said cavity,
     - (iii) a guiding and hinge portion, said guiding and hinge portion constituting:
       - (a) a cavity-defining means slidable in the cavity at the proximal end of the bar and including a closed wall at its distal end,
       - (b) a slender hinge end protruding from the cavity-defining means at the proximal end thereof,
       - (c) means pivotally connecting the hinge end to the base,
     - (iv) a spring within the cavity-defining means, said spring having one end abutting the projection and the other end abutting the closed wall of the cavity-defining means, said spring being of helical configuration and under compression, and
   - (D) a cover having a skirt located within the cavity in the bar and a base overlying the cavity-defining means and including means securing the cover to the bar,
   - (E) whereby the spring hinge permits the bar to be spread horizontally beyond normal open use position and to be angled vertically away from normal open use position, the latter by horizontal flexure of the slender hinge end,
   - (F) the front corner of the bar abutting the base to limit outward angling movement of the bar in a horizontal plane beyond normal use postion,
   - (G) the hinge and guiding portion being of synthetic resilient plastic.

2. A spreadable bar for eyeglass frames provided with a spring hinge, according to claim 1, wherein the spring of said hinge is made of a synthetic material.

3. A spreadable bar for eyeglass frames provided with a spring hinge, according to claim 1, wherein the outer sides of the hinging bases of said bars are inwardly slanted.

* * * * *